(12) United States Patent
Kurtz et al.

(10) Patent No.: US 6,543,293 B1
(45) Date of Patent: Apr. 8, 2003

(54) STATIC PITOT TRANSDUCER

(75) Inventors: Anthony D. Kurtz, Ridgewood, NJ (US); Joseph Van De Weert, Cliffisde Park, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

(21) Appl. No.: 10/062,845

(22) Filed: Jan. 31, 2002

(51) Int. Cl.$^7$ .................................................. G01L 9/06
(52) U.S. Cl. ......................................................... 73/727
(58) Field of Search ........................... 73/714, 715, 716, 73/717, 718, 719, 720, 721, 722, 723, 724, 725, 726, 727, 861.65, 861.66, 861.67, 861.68

(56) References Cited

U.S. PATENT DOCUMENTS

| | | | |
|---|---|---|---|
| 5,955,771 A | 9/1999 | Kurtz et al. | 257/419 |
| 6,272,928 B1 | 8/2001 | Kurtz | 73/721 |

OTHER PUBLICATIONS

Analog Devices, www.analog.com, 1999, pp. 1–12 (No mo.).
Fairchild Semiconductor, www.fairchildsemi.com, pp. 1–23 (No date).
Melexis, www.melexis.com, pp. 1–26 (No date).

*Primary Examiner*—William Oen
(74) *Attorney, Agent, or Firm*—Duane Morris LLP (57) ABSTRACT

A differential and absolute transducer are secured to a Pyrex glass header by means of a glass metal frit or other suitable interface. One of the sensors measures absolute pressure and the sensor is a sealed cavity, while the other sensor is designed to measure differential pressure and the sensor is an aperture which permits the pressure media to reach both sides of the sensor. The header itself has a through hole connected to a tube over which the differential sensor is affixed. The Pyrex glass is chosen to match the coefficient expansion of the sensors. The header in turn is attached to the tubular member provided with a fitting such that static pressure can be applied to both sensors simultaneously. At the other end of the tubular member, there is provided another fitting attached to the tube in the header through which the total pressure can be applied to the differential sensor, thus permitting the measurement of the difference between the total pressure and the static pressure. Each of the sensors is fabricated by the same processing techniques and is of the same thickness, but have different deflecting areas such that the differential sensor will have a greater stress through the same pressure. By obtaining both the differential and the static pressure, one can now determine air speed by the solution of several derived equation for speed in both a compressible and an incompressible flow, such as through air or any other fluid.

20 Claims, 7 Drawing Sheets

STATIC PITOT TRANSDUCER

FIELD OF INVENTION

This invention relates to a method and structure for fabricating an improved static-pitot pressure transducer.

BACKGROUND OF THE INVENTION

The ability to determine air from the measurement of the static (barometric) air pressure and the pitot air pressure, induced by the movement of a vehicle through air, has long been known from Bernoulli's theorem for total air pressure in an incompressible flow, such as through air (below 250 mph) or any other incompressible fluid. Bernoulli states that the static pressure plus the dynamic pressure is equal to the total pressure. This can be expressed by the following equation:

$$P_S + \frac{1}{2}\rho v^2 = P_T$$

Where $P_S$=Static pressure
$P_T$=Impact Pressure
$\rho$=density of the fluid
v=fluid velocity For an ideal incompressible gas we can use the relation for density:

$$\rho = \frac{P_S M}{RT}$$

And obtain an equation for velocity:

$$v = \sqrt{\frac{2RT}{M}\left(\frac{P_A}{P_S}\right)}$$

Where $P_A = P_T - P_S$
M=Molecular Mass
T=Absolute Temperature
R=The Universal Gas Constant For higher speeds (between 250 and 750 mph) Bernoulli's equation does not apply because the air becomes compressible. For this case another equation must be used:

$$\frac{v^2}{2} + \hat{h}_S = \hat{h}_T$$

Where v=velocity
h=enthalpy (the total internal energy plus pressure divided by density)

Using several simple relations for temperature and pressure in an ideal gas it is possible to obtain a relation for the velocity:

$$v = \sqrt{\frac{2\gamma RT_s}{M(\gamma-1)}\left[\left(\frac{p_\Delta + p_s}{p_s}\right)^{\frac{\gamma-1}{\gamma}} - 1\right]}$$

Where $\gamma$=the ratio of specific heats $C_P/C_V$

In either case, to obtain air speed v, one must accurately measure $P_S$, $P_A$ and T and then perform the required computations. It is, of course, clear that the accurate determination of v requires very accurate measurements of the static pressure $P_S$ and the differential pressure $P_A$. The basic concept of obtaining air speed from pressure measurements is very old, and there are countless methods and structures for accomplishing the same. However, most previous structures are either too inaccurate, too large, too costly or too fragile and often all of the above. For example, a pitot tube air speed indicator consists of two elements, where one is a dynamic tube which points upstream and determines the dynamic pressure and the other is a static tube which points normal to the air stream and determines a static pressure at the same point. These tubes are connected to two sides of a manometer or an inclined gauge such as to obtain a reading of velocity pressure, which is the algebraic difference between the total pressure and the static pressure. In any event, such tubes have been used in aerospace applications and can also be used as a liquid flow-measuring device, but because of their tendency to clog, cannot be used with liquids which have suspended solid matter.

This is an example of a very old prior art device, which has many, many problems including being very large, fragile and so on.

It is therefore an object of the present invention to provide an improved method to produce a smaller, cheaper, more rugged, highly accurate static pitot pressure transducer, which is also capable of accurately measuring air speed.

SUMMARY OF INVENTION

The present invention employs two uniquely designed dielectrically isolated leadless piezoresistive semiconductor sensors on a specially designed Pyrex glass header using an inorganic ceramic glass to secure the diaphragm to the header and a glass metal frit to interconnect the two diaphragms to the requisite pins or terminals on the header. One of the sensors is designed to measure absolute pressure and, as such, has a sealed cavity, while the other sensor is designed to measure differential pressure and, as such, has an aperture which permits the pressure media to reach both sides of the sensor. The header itself has a through hole connected to a tube over which the differential sensor is affixed. The Pyrex glass is chosen so as to match the expansion coefficient of the sensor. The header is attached to a tubular member provided with a fitting such that static pressure can be applied to both sensors simultaneously. At the other end of the tubular member, there is provided another fitting attached to the tube in the header through which the total pressure can be applied to the differential sensor, thus permitting the measurement of the difference between the total pressure and the static pressure. Each of the sensors is fabricated using the same processing techniques and can be fabricated from the adjacent pieces of the same semiconductor wafer. The sensors are of the same thickness, but have different deflecting areas such that the differential sensor would have the greater stress upon it for the same pressure. The design of the sensors and the header leads to several unanticipated advantages. Since the expansion coefficient of the Pyrex matches that of the sensor so closely, not only is the induced thermal stress very low, but it does not vary with time resulting in an apparatus that is much more stable. In addition, since the sensors have the same thickness and are made by the same process, they match each other more closely allowing their individual variations to cancel each out.

On the total pressure end of the tubular structure there is also affixed a probe containing an RTD (a resistive temperature device) such that the temperature of the dynamic airflow may be measured. There is also provided various electronic circuits so that the air speed and other parameters may be accurately calculated based on the measurement of the differential and static pressures as determined by the above noted-equations.

DETAILED DESCRIPTION OF THE FIGURES

Figure 1:
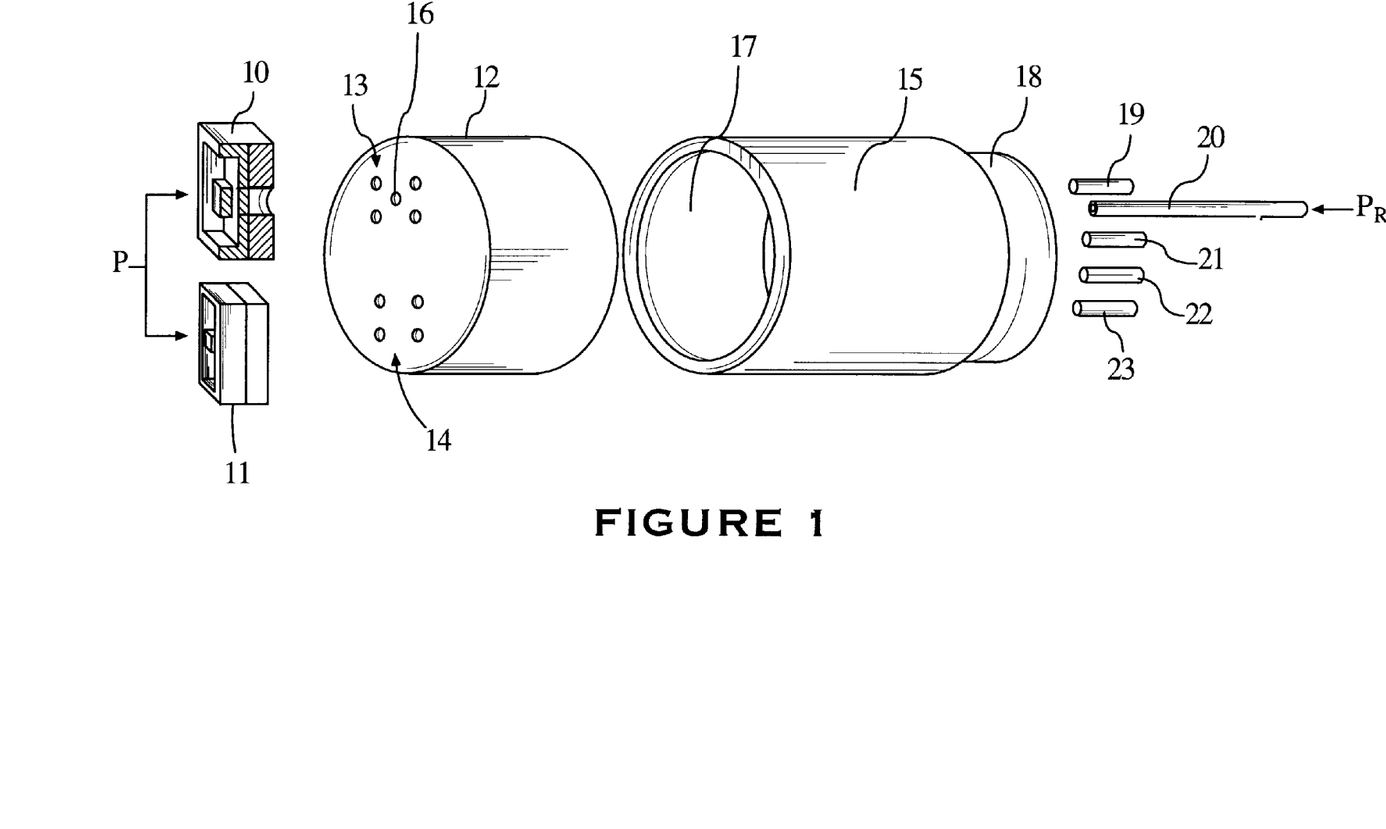
FIG. 1 is an exploded view showing an absolute and differential pressure transducer including the glass header and the header shell for a pitot device according to this invention.

Referring to FIG. 1, there is shown an assembly which consists of an absolute pressure sensor 11 and a differential pressure sensor 10. The pressure sensors 11 and 10 are shown in cross section and essentially are determined to be an absolute and differential pressure sensor because of the application of pressure to the sensors. In the case of the absolute sensor 11, that sensor, as will be explained, receives a single applied pressure to a top surface indicative of the static pressure. Pressure sensor 10 receives both the static pressure on the top surface and receives a reference pressure via the reference tube 16. The fabrication of such sensors is well known in the art based on some of the work implemented by Kulite Semiconductor Products, Inc., the assignee herein. A co-pending application designated at Kulite-66, filed on Dec. 12, 2001 and entitled, "Combined Absolute Differential Transducer" depicts pressure sensors which can be employed for sensors 10 and 11 and, in fact, that application does disclose absolute and differential pressure sensors which can, in fact, be fabricated from the same wafer or from separate wafers as, for example, shown in FIG. 1. Reference is also made to U.S. Pat. No. 6,272,928 entitled, "Hermetically Sealed Absolute and Differential Pressure Transducers" issued on Aug. 14, 2001 to A. D. Kurtz, the inventor herein and assigned to the assignee herein. Reference is also made to U.S. Pat. No. 5,955,771 entitled, "Sensors for use in High Vibrational Applications and Methods for Fabricating Same", which issued on Sep. 21, 1999 to A. D. Kurtz et al. and assigned to Kulite Semiconductor Products, Inc. The sensors 10 and 11 are fabricated according to the processes described in the above noted patents and are generally designated as leadless sensors. They are fabricated from silicon and have dielectrically isolated piezoresistors located on the diaphragm region of the sensor. The sensors have glass covers or support structures and are fabricated using sacrificial silicon wafers with pattern wafers. This technology is clear from the above-noted patents, all of which are incorporated herein by reference.

As will be explained, sensors 11 and 10 are associated and would be mounted on a Pyrex header 12. The header 12 is fabricated from Pyrex and has through holes as the four holes designated by reference numeral 14 associated with the absolute sensor 11 and five holes designated by numeral 13 associated with the differential sensor 10. The central hole 16 is the hole for receiving the reference tube or reference pressure. The hole configurations 13 and 14 are all directed through the glass header 12, which is again a Pyrex header. The holes 13 and 14 are to accommodate terminal pins which, as will be explained, enable contact to be made to the piezoresistive transducer arrangements formed on the absolute and the differential sensors 10 and 11. Each of the sensors are secured to the header 12 by means of inorganic ceramic glass, which secures the diaphragms to the header and a glass metal frit which interconnects the two sensors and associated diaphragms to the requisite pins on the header. The pins are designated by reference numerals 19, 21, 22 and 23, while the reference tube is designated by numeral 20. As seen, the Pyrex header is inserted into aperture 17, which forms part of a header shell 15. The header shell 15 can be fabricated from a suitable metal or other material. The header has a bottom recess 18 for insertion into another housing, as will be explained. The header shell 15 also has corresponding apertures so that the pins and reference tubes can be inserted through the corresponding apertures in the header and make contact with the absolute and the differential pressure sensors 10 and 11.

As indicated, the sensors are made by the same processing and, as indicated in the above-referenced co-pending application, can be made from adjacent pieces of the same semiconductor wafer or for different wafers using the same processing technique. Each sensor is of the same thickness, but has different deflecting areas. As seen in FIG. 1, the deflecting area of the differential sensor is such that the differential sensor will have a greater stress upon it for the same pressure applied to the top surface (designated by arrow P). As indicated, since the header 12 is fabricated from Pyrex, the Pyrex expansion coefficient matches the coefficient of the sensors extremely closely, as both sensors are fabricated using silicon technology. This provides for an induced thermal stress, which is extremely low, but is also does not vary with time, resulting in an apparatus that is extremely stable. Furthermore, since the sensors 10 and 11 have the same thickness and are made by the same process, they track and match each other very closely, allowing their individual variations to cancel.

Figure 2:
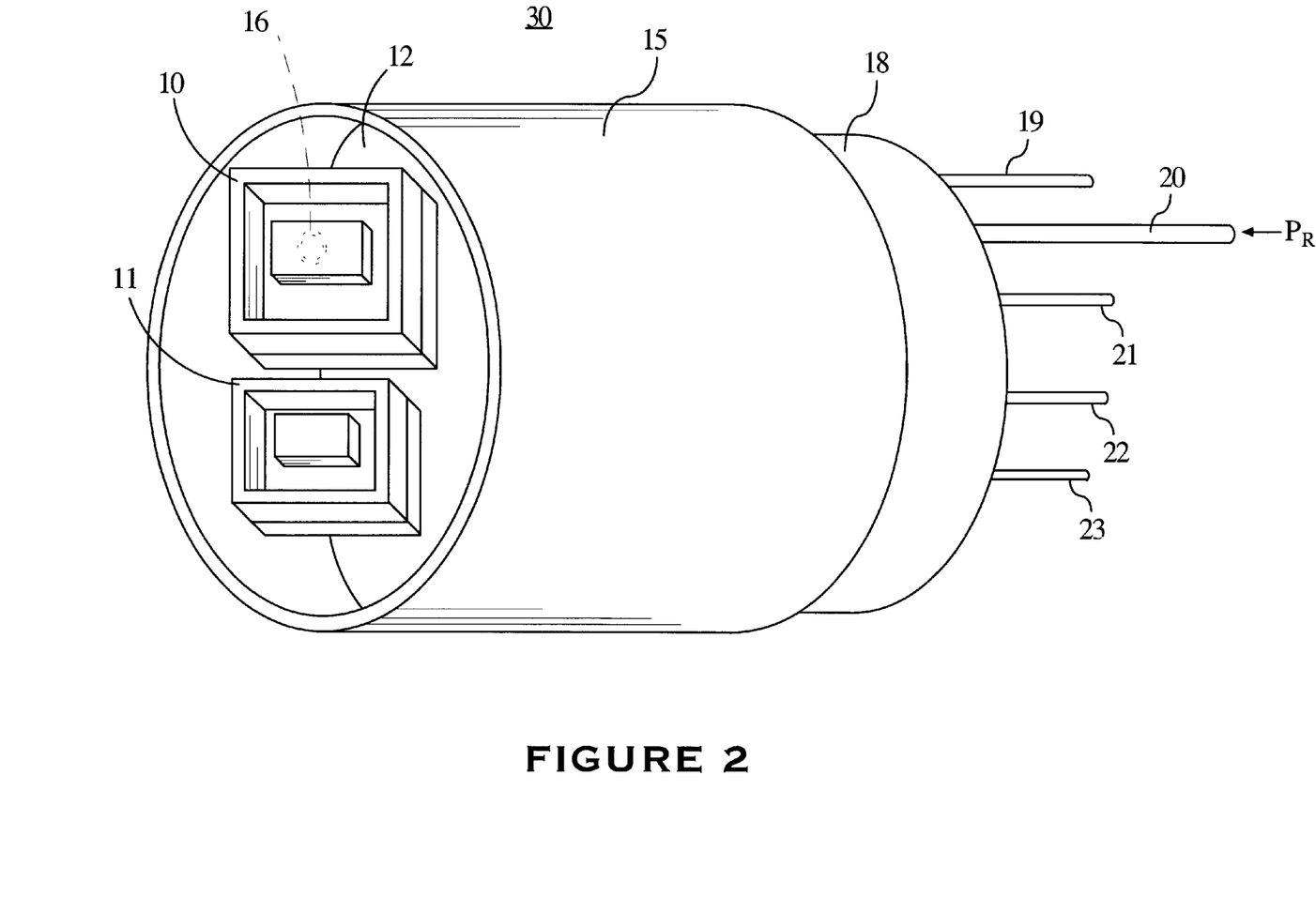
FIG. 2 shows the apparatus of FIG. 1 in an assembled perspective view.

Referring to FIG. 2, there is shown the assembled header 15 including the absolute sensor 11 and the differential sensor 10 secured to the glass header 12 with pins 23, 22, 21 and 19 making contact with the terminals of the piezoresistive sensors. The reference tube 20 being applied to the bottom port 16 of sensor 10 so that the differential sensor 10 can receive the pressure P applied to the top surface, as does the absolute sensor 11, while the differential sensor 10 also receives the reference pressure $P_R$ via tube 20. The pressure $P_R$ is applied to the underside of the diagram, as is known for developing differential pressure. Therefore FIG. 2 shows the assembled module, which for the sake of convenience, is designated by reference numeral 30.

Figure 3:
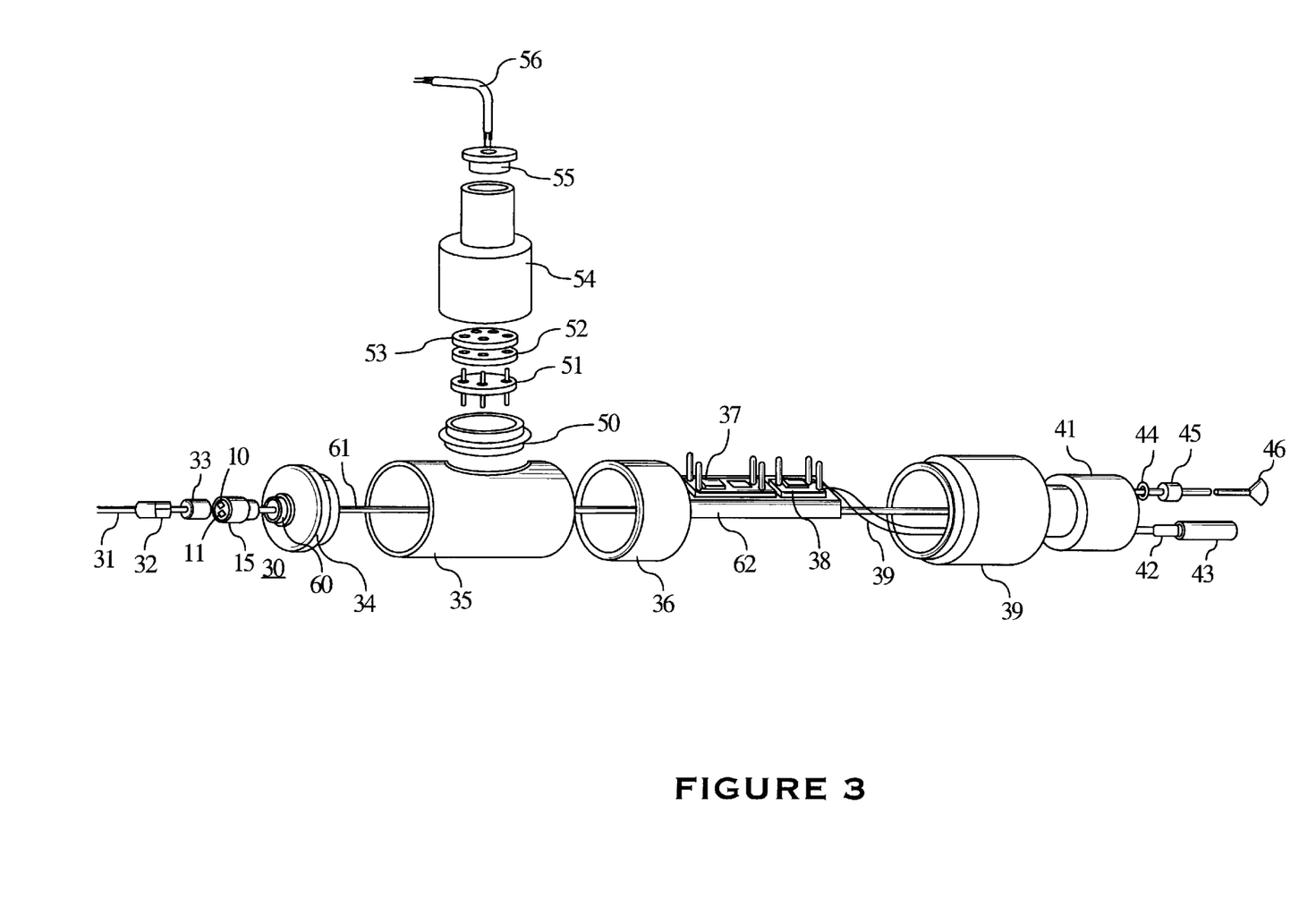
FIG. 3 shows an exploded view of a complete static pitot transducer according to this invention.

Referring to FIG. 3, there is shown an exploded view of a complete static pitot pressure transducer according to this invention. As seen in FIG. 3, reference numeral 30 refers to the assembled header (15 of FIG. 2), including the absolute pressure transducer 11 and the differential pressure transducer 10. As one can see now, there is a first pressure input tube 31 which essentially receives the static pressure. The pressure tube 31 is coupled to the top surface of the header 30 where the absolute and differential sensors 10 and 11 receive the input pressure applied to the pressure tube 31. The pressure tube 31 is essentially directed to the top surface by a tube adapter 33 which fits over the header 15 and which is secured to a header adapter 34 by means of a nut 32. Nut 32 engages the top threaded surface 60 of the header adapter 34. The header adapter 34 is thereby secured to one end of a housing sleeve 35. As can be seen, the wire or cable assembly 61 extends through the device and couples to the output terminals of the absolute and differential sensors. Numeral 36 refers to an amplifier holder housing and as will be explained, there are circuit modules 37 and 38 positioned on a circuit substrate or board 62. The circuit modules 37 and 38 may include, for example, dividing and squaring circuits and as will be explained, are utilized to solve the above equations to enable one to obtain the airspeed and therefore utilize the value of the air speed to perform various functions.

Essentially, there is a pressure port header 40 which is associated with a reference pressure tube 46. Tube 46 receives the reference pressure and is inserted into the pressure port header 40 by means of an O-ring 44 and a press-fit ring 45. Also shown is another input which consists of an RTD device 42 which is covered by a sheath 43. The RTD device is a resistive temperature-sensing device and the RTD output 39 is further directed to the circuit modules 37 and 38. Co-extensive with the center sleeve 35 is a header adapter 50, which accommodates a header 51. The header 51 accommodates insulator member 52, which is placed on header 51. This insulates an array of capacitors 53. The components described are secured to the sleeve 35 by means of a cable release header 54. A crimp ring 55 secures a biasing cable 56 which is coupled to the capacitor array which filters the biasing voltage. Essentially, the modules as described above, include the biasing wire 56, including a capacitive array 53 to provide filtering for the biasing signals. This is utilized to bias the integrated circuits 37 and 38 on the substrate 62.

As one can therefore see from FIG. 3, static pressure is applied to both sensors 10 and 11 simultaneously via tube 31. At the other end of the device is the reference tube 46, which applies total pressure to the differential sensor, thus, permitting the measurement of the difference between total pressure and static pressure. As indicated, each of the sensors 10 and 11 are made by the same processing and, in fact, may be made from adjacent pieces of the same semiconductor wafer.

Figures 4, 5:
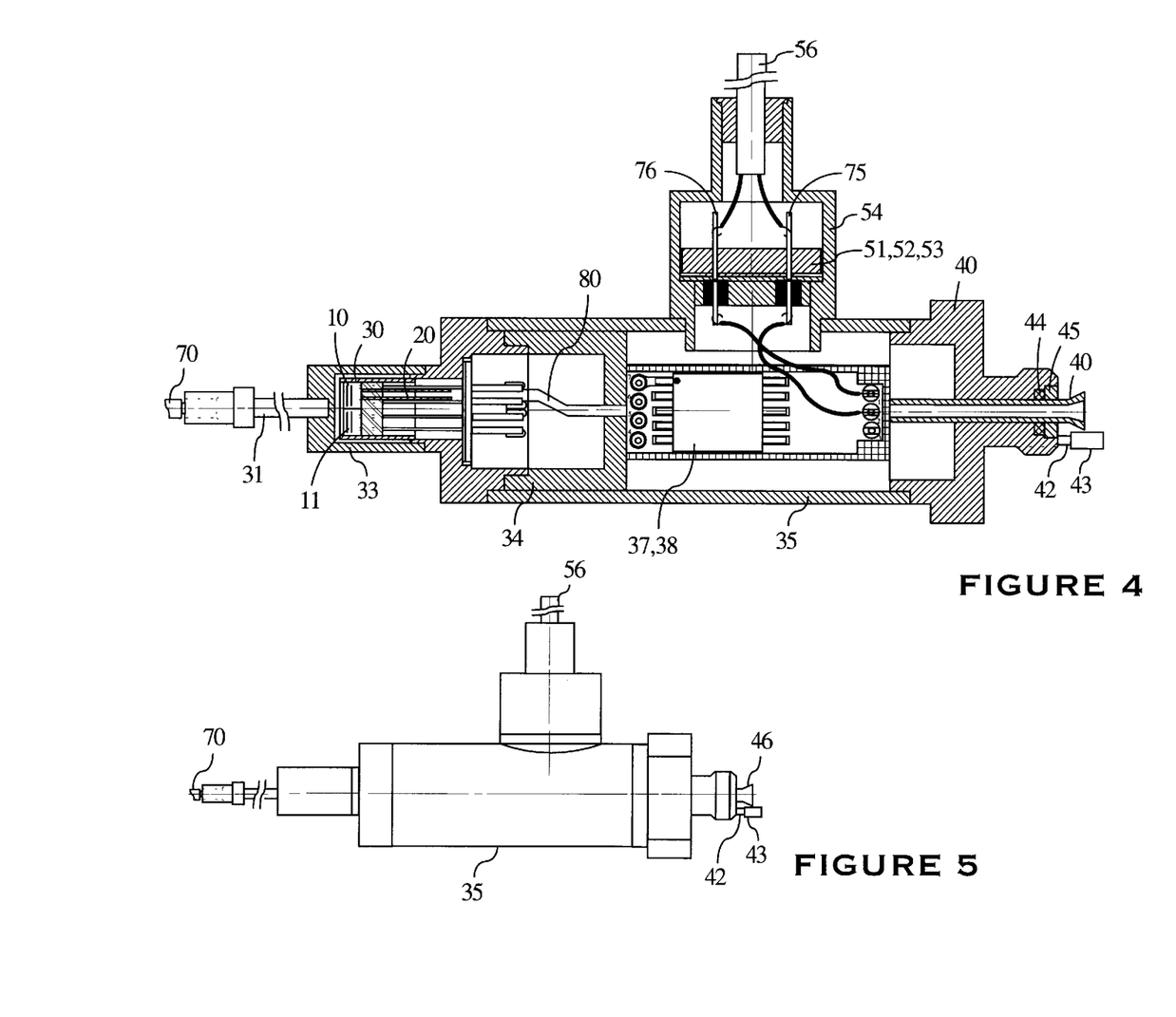
FIG. 4 shows a sectional view of the static pitot transducer of FIG. 3.
FIG. 5 shows a static pitot transducer of FIGS. 3 and FIG. 4 in the diagram depicting actual size as compared to the size depicted in FIG. 4.

Referring to FIG. 4, there is shown the complete assembly in cross section of FIG. 3 utilizing the same reference numerals. There is also shown a ferrule 70, which is associated with the input pressure tube 31. As indicated, the same numerals have been utilized in FIG. 4, as shown in FIG. 3. It is also seen that cable 56 is in fact connected to the terminals 75 and 76 of capacitor array, which supply biasing for the electronic circuits. It is also seen that FIG. 4 includes the RTD 43. The RTD 43 measures the temperature T. It is seen that the reference pressure applied to the pressure inner tube 46 is directed through the module, as for example, into tube 80 to interface the reference tube 20 associated with the differential transducer assembly. The differential transducer assembly 10 receives both pressure from reference tube 46 on the underside of the diaphragm and static pressure from input port 41 from the top side of the diaphragm.

Referring to FIG. 5 there is shown a diagram of the static pitot airspeed device of FIG. 4 in true size as compared to the enlarged FIG. 4. While it is understood that these drawings may not be actual size, the device is shown, for example, from the input ferrule 70 to the reference tube 46 has a length of about 2 and $^{15}/_{16}$ inches, while the height of the device from the input cable 56 to the bottom of the sleeve 35 is about 1½ inches.

As one can ascertain by referring to FIG. 6, there is shown a block diagram of the measurement of static air speed at low speeds (below 250 mph) utilizing conventional digital circuits. Essentially, the static pressure, which is obtained from the absolute pressure transducer, is depicted by module 80, while the pitot pressure, which is obtained from the differential transducer, is indicated by module 81. The temperature of the unit is dictated by module 85 and essentially is determined by the RTD device. One performs digital correction by a first digital circuit 82 and a second digital circuit 83. Digital correction for pressure sensors is well known and the pressure sensors are compensated for pressure output by compensating the output according to temperature. Such techniques are well known in the prior art and, for example, the assignee herein has many patents which relate to the correction of sensor outputs according to temperature, voltage variation and so on.

As one can see, a first equation is shown in module 90. This equation is solved by the circuitry using the differential pressure ($P_{diff}$), the static pressure ($P_{static}$), the temperature (T) and a constant (K). As can be seen from above, this equation provides the first half of the Bernoulli constraints at an output. The output is applied to an operational amplifier 91 for further amplification and then to a square root module 92. Module 92 obtains the square root of the above-noted output of module 90 to develop the output speed or fluid velocity v. As once can see the output voltage corresponding to speed v will vary from 0 to 5 volts.

Figure 7:
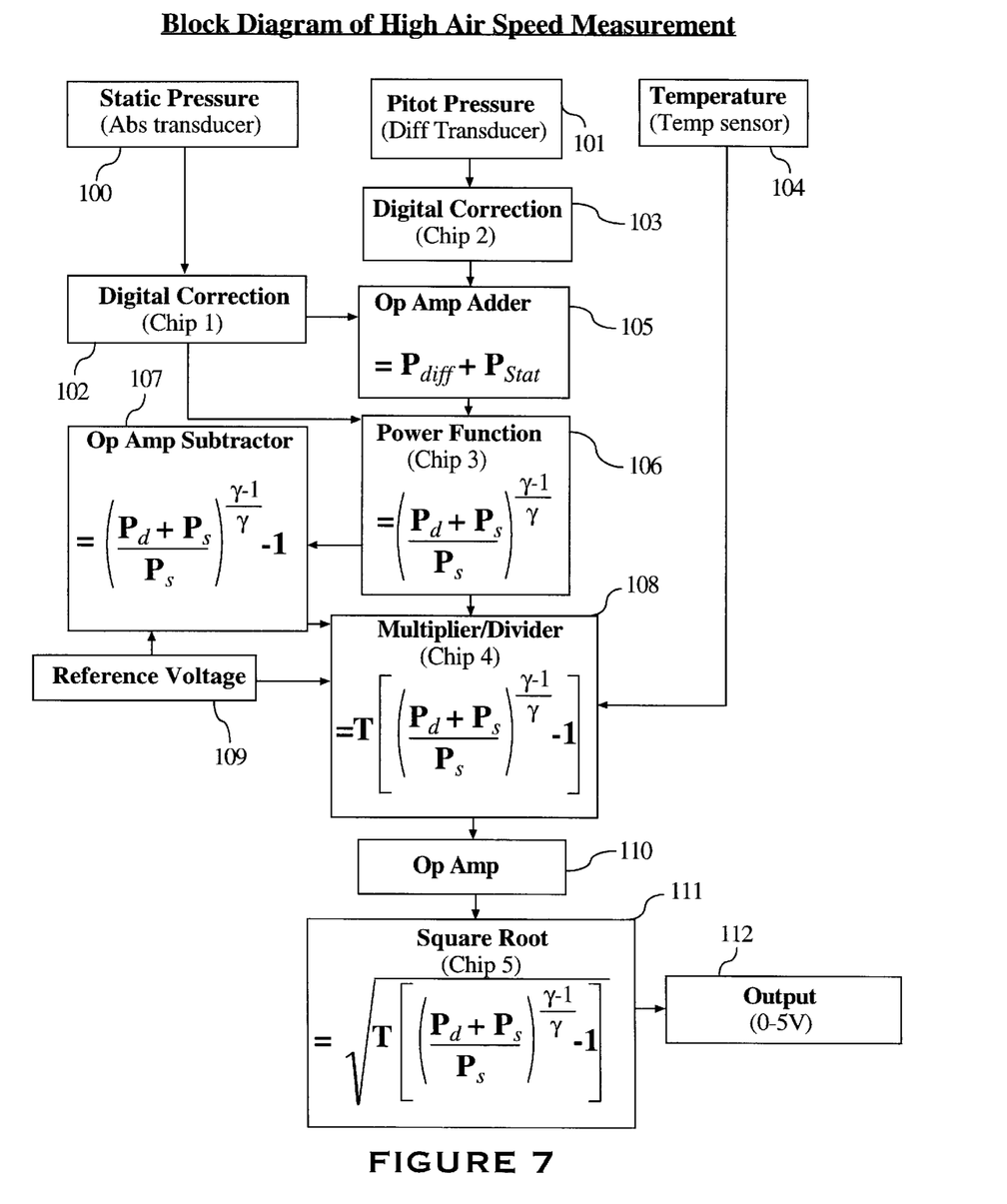
FIG. 7 is a block diagram of another procedure for measuring air speed.

As once can ascertain by referring to FIG. 7, there is shown a block diagram of the measurement of static air speed at high speeds (from 250 to 750 mph) utilizing conventional digital circuits. The pressure and temperature measurements are acquired and compensated the same way as in the low speed case.

As one can see the output from the two digital compensation chips go into an operational amplifier 105. This output plus the output from the static pressure ($P_{static}$) then go into circuitry 106 which takes the ratio of the two inputs and raises it to a constant power. This output is then sent through an operational amplifier subtractor 107 which subtracts a constant 109 from it. It is then fed into more circuitry 108 which uses the temperature (T) to perform another calculation on it. The output is applied to an operational amplifier 110 for further amplification and then to a square root module. Module 111 obtains the square root of the above-noted output of module 108 to develop the output speed or fluid velocity v.

The measurement of speed (both high and low) as one can ascertain, has many applications. For example, one can measure air speed as well as ground speed. Essentially, by the determination of the speed, one can now adjust a spoiler or other device on an automobile according to the actual air speed of the automobile. In this manner, the spoiler will always be controlled according to the actual air speed and for example, as part of a feedback system, one can now determine the tilt of the spoiler in regard to actual air speed.

Figure 8:
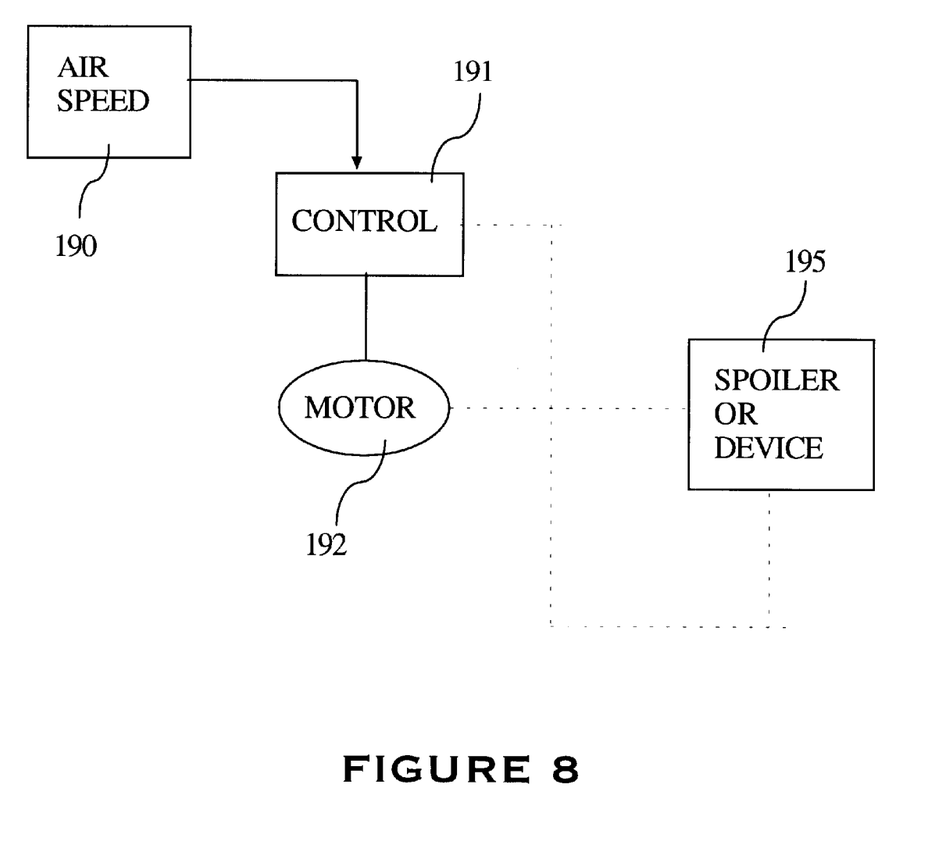
FIG. 8 shows a simple block diagram of a servo system which basically utilizes calculated air speed from the present device to determine the position or orientation of a spoiler or other device.

Referring to FIG. 8, there is shown a very simple servo system whereby the air speed as detected by the pitot detector described above, develops the output voltage indicative of speed in module 190. This voltage is applied to a control circuit 191 which may control a motor 192, depending on the voltage as defined by the air speed detector 190 and the control circuit 191. The motor 192 is coupled to a spoiler or other device 195 and therefore changes or moves the angle of the spoiler corresponding to the actual air speed. Therefore the lift on an automobile or the lift on an airplane is always accurately determined. For example, by such a system, the spoiler or any other device also has an input feedback to the controller 191 so that the control circuit 191 knows the position of the spoiler or any other device and controls it accordingly to the detected air speed 190. Controller 191 can be a microprocessor or other processing circuit. Thus, the ability to determine air speed has many applications as in aircrafts, rockets, as well as racing and conventional cars. As one can ascertain, the circuits which will provide or produce and solve the equations, for example, according to FIG. 6, are manufactured by many different entities.

Figure 6:
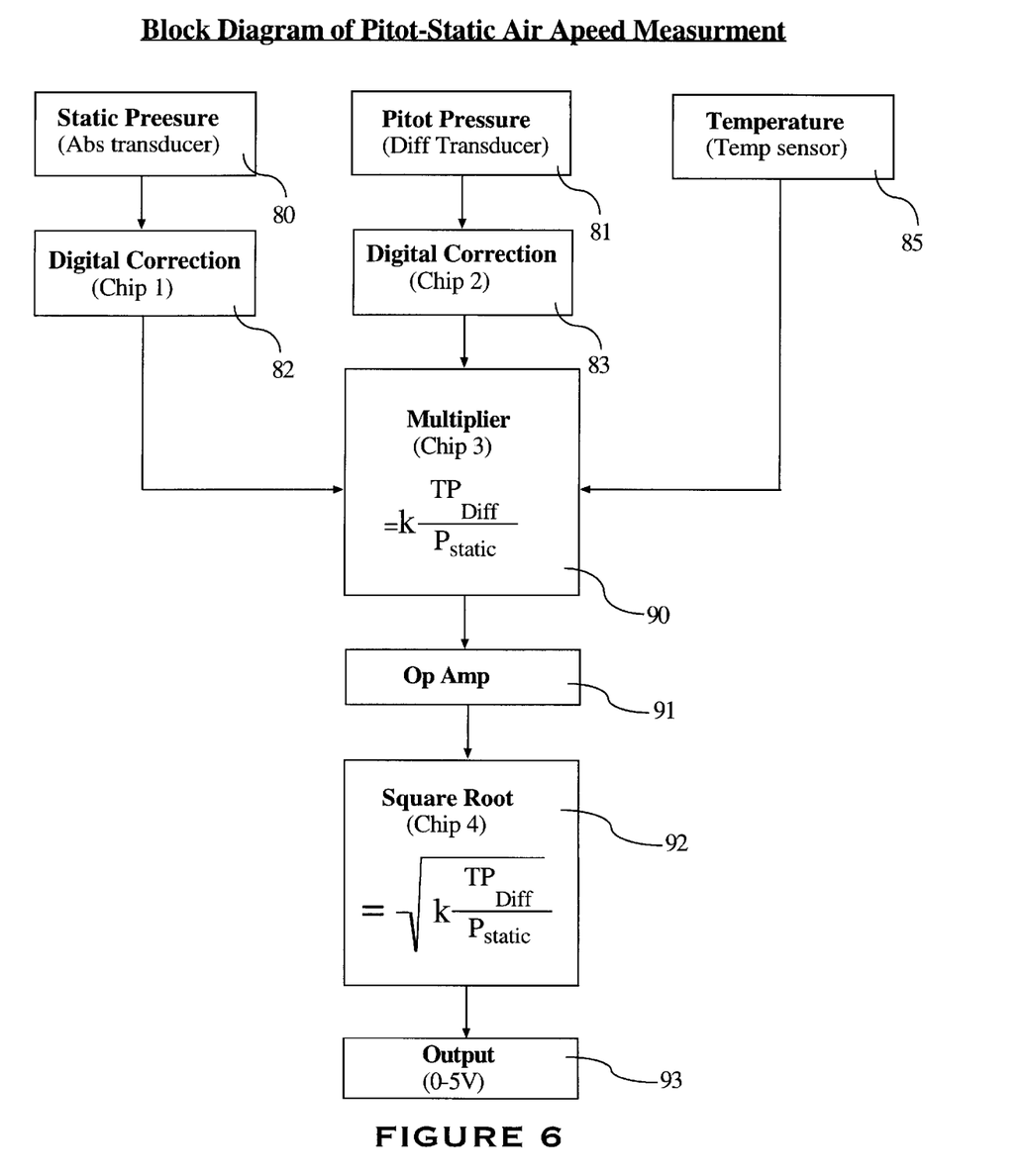
FIG. 6 is a block diagram showing the solution of the equations utilizing static pressure obtained from an absolute transducer and differential pitot pressure obtained from a differential transducer according to this invention.

For example, reference is made to circuits provided by Fairchild Semiconductor Company designated as the RC4200, which is an analog multiplier device, which device can perform all multiplying functions necessary to solve the equation shown, for example, in module 90 of FIG. 6.

Other devices which are, for example, manufactured by a company called Melexis (Microelectronic Integrated Systems) sold under the designations MLX90308CCC entitled, "Programmable Sensor Interface". This is a dedicated microcontroller which performs signal conditioning for sensors wired in bridge or differential configurations. This device can essentially interface with the static and differential pressure transducers and provide digital correction of such transducers, as well as account for temperature changes of such transducers. It is a widely employed module utilized in many sensor configurations.

A company by the name of Analog Devices also produces a multiplier/divider sold under the designation as AD734, which is an accurate high speed, four-quadrant analog multiplier, which device can perform the square rooting function necessary to solve the equation shown, for example, in module 92 of FIG. 6. The also produce a real-time analog computational unit sold under the designation as AD538, which device can perform the power function necessary to solve the high speed equation shown, for example, in module 106 of FIG. 7. Therefore, the circuits, which are designated by reference numerals 37 and 38 of FIG. 3, are commercially available circuits and are made by the above-noted manufacturers and many others.

It would, of course, be understood by one skilled in the art that there are many other techniques for providing the solutions of the equations using the unique device as described above. It is therefore indicated that all such alternatives and devices are deemed to be incorporated herein and all such equivalent devices are also deemed to be incorporated herein.

As indicated, the invention has been described in preferred form with a certain degree of particularity. It is understood that the present disclosure of the preferred form is by way of example and many changes in the details of construction and combination and arrangement of parts made be made without departing from the spirit and scope of the invention as herein and as claimed.

What is claimed is:

1. Apparatus for providing an absolute and differential pressure output comprising:

first and second pressure sensors each of the same thickness and each fabricated by the same processing procedures, each having a different diaphragm area with at least one piezoresistive semiconductor device located on said diaphragm portion of each sensor and each sensor having a top and a bottom surface, a glass header having a first plurality of apertures associated with said first sensor and a second plurality of apertures associated with said second sensor, a pressure port through said header and located central to said second plurality of apertures to receive a reference pressure, said first sensor secured to said header at said bottom surface and aligned with said first plurality of apertures to define terminal contact areas for said first sensor, said second sensor secured to said header at said bottom surface and aligned with said second plurality of aperture to define terminal contact areas for said second sensor and with said pressure port located at said bottom surface of said second sensor within the diaphragm portion, means for applying a first pressure to said top surface of said first and second sensors and means for applying a reference pressure to said reference port whereby said first sensor provides an output indicative of said first pressure and said second sensor provides an output indicative of the difference between said first pressure and said reference pressure, wherein said first pressure is static pressure and said second sensor output is pitot pressure.

2. The apparatus according to claim 1 wherein said glass header is fabricated from Pyrex glass.

3. The apparatus according to claim 1 wherein said first and second sensors are silicon sensors.

4. The apparatus according to claim 1 wherein said first and second sensors are secured to said glass header by an inorganic ceramic glass.

5. The apparatus according to claim 1 wherein said terminal areas of each sensor contain a glass metal frit.

6. The apparatus according to claim 1 further including a metal tubular sleeve having a top opening for receiving said header and a bottom opening for receiving a pressure inlet tube to co-act with said pressure port in said glass header to provide a reference pressure to said second sensor with said top opening having a cover including a pressure tube for introducing said first pressure to said top surfaces of said first and second sensors.

7. The apparatus according to claim 6 operative to determine air speed including:

In the case of a low velocity unit a first electronic circuit responsive to said output of said first sensor and said output of said second sensor to provide at an output the ratio of said second output to said first output indicative of the differential pressure divided by said first pressure, means for multiplying said output of said first circuit by the absolute temperature to provide a second output, a second electronic circuit for producing an output indicative of the square root of said second output which output is directly proportional to air speed (v), In the case of a high velocity unit a first electronic circuit responsive to said output of said first sensor and said output of said second sensor to provide at an output the ratio of said second output to said first output raised to a constant power indicative of the differential pressure divided by said static pressure raised to a constant power, A second electronic circuit for producing an output indicative of said first output minus a constant multiplied by the absolute temperature, A third electronic circuit for producing an output indicative of the square root of said output which output is directly proportional to air speed (v).

8. The apparatus according to claim 7 wherein for the case of low speed said second circuit produces an output according to the following equation:

$$v = \sqrt{KT\left(\frac{P_A}{P_S}\right)}$$

Where
v=velocity
T=temperature
K=constant(fixed value)
$P_S$=output of said first sensor
$P_A$=output of said second sensor For the case of high speed said third circuit produces an output according to the following equation:

$$v = \sqrt{K_1 T_s \left[\left(\frac{p_\Delta + p_s}{p_s}\right)^{K_2} - 1\right]}$$

Where
v=velocity
T=temperature
$K_1$=constant(fixed value)
$K_2$=constant(fixed value)
$P_S$=output of said first sensor
$P_A$=output of said second sensor.

9. The apparatus according to claim 8 further including a biasing circuit for supplying operating potential to said first and second electronic circuits.

10. The apparatus according to claim 1 wherein said first sensor is an absolute pressure sensor and said second sensor is a differential pressure sensor.

11. The apparatus according to claim 10 wherein said diaphragm of said differential sensor has a greater stress applied to said diaphragm than the stress applied to said absolute sensor for the same pressure.

12. The apparatus according to claim 1 wherein said first and second sensors are each dielectrically isolated piezoresistive semiconductor sensors.

13. The apparatus according to claim 12 wherein said first and second sensors are fabricated from adjacent pieces of the same semiconductor wafer.

14. The apparatus according to claim 12 wherein said first and second sensors are fabricated from different semiconductor wafers.

15. The apparatus according to claim 6 further including a temperature-measuring device coupled to said sleeve and operative to provide an output indicative of the operating temperature T of said sleeve environment.

16. The apparatus according to claim 15 wherein said temperature measuring device is an RTD.

17. The apparatus according to claim 1 wherein said first and second plurality of apertures contain a first and a second plurality of terminal pins for contacting said first and second sensors.

18. The apparatus according to claim 8 further including digital correction means coupled to said first and second sensors for adjusting the outputs according to temperature.

19. The apparatus according to claim 8 including a processor for solving said equation.

20. The apparatus according to claim 7 further including, means responsive to said output proportional to air speed for providing a control voltage according to the same, and means responsive, to said control voltage for varying an air speed sensitive device orientation according to said control voltage.

* * * * *